US009065707B2

(12) United States Patent
Frisken et al.

(10) Patent No.: US 9,065,707 B2
(45) Date of Patent: Jun. 23, 2015

(54) POLARIZATION-INDEPENDENT LCOS DEVICE

(75) Inventors: Steven James Frisken, Vaucluse (AU); Glenn Wayne Baxter, Hornsby Heights (AU); Qihong Wu, Campsie (AU)

(73) Assignee: Finisar Corporation, Horsham, PA (US)

( * ) Notice: Subject to any disclaimer, the term of this patent is extended or adjusted under 35 U.S.C. 154(b) by 372 days.

(21) Appl. No.: 13/609,321

(22) Filed: Sep. 11, 2012

(65) Prior Publication Data
US 2013/0070326 A1    Mar. 21, 2013

Related U.S. Application Data

(60) Provisional application No. 61/535,211, filed on Sep. 15, 2011.

(51) Int. Cl.
*G02F 1/13* (2006.01)
*H04L 27/18* (2006.01)
*H04L 27/20* (2006.01)

(52) U.S. Cl.
CPC ............ *H04L 27/18* (2013.01); *H04L 27/2096* (2013.01)

(58) Field of Classification Search
CPC ............................... G02F 1/31; G02F 2203/50
USPC ..................................... 349/196, 98; 359/279
See application file for complete search history.

(56) References Cited

U.S. PATENT DOCUMENTS

| 6,327,019 | B1 | 12/2001 | Patel et al. |
| 2002/0131691 | A1 | 9/2002 | Garrett et al. |
| 2005/0078237 | A1* | 4/2005 | Klaus et al. ..................... 349/98 |
| 2008/0043187 | A1* | 2/2008 | Mimura et al. ............... 349/114 |

FOREIGN PATENT DOCUMENTS

| WO | 03/032071 A1 | 4/2003 |
| WO | 2004/005993 A1 | 1/2004 |

OTHER PUBLICATIONS

Collings, Neil, et al., The Applications and Technology of Phase-Only Liquid Crystal on Silicon Devices, Journal of Display Technology, Mar. 2011, pp. 112-119, vol. 7, No. 3, IEEE.

(Continued)

*Primary Examiner* — Thanh-Nhan P Nguyen
(74) *Attorney, Agent, or Firm* — Kurt Rauschenbach; Rauschenbach Patent Law Group, LLC

(57) ABSTRACT

Described herein is an optical phase modulator (20) including a liquid crystal element (22), disposed between a pair of opposing electrodes (24) and (26). The electrodes (24, 26) are electrically driven for supplying an electric potential V across the liquid crystal element (22) to drive the liquid crystals within element (22) in a predetermined configuration. Electrode (26) includes a grid of individually drivable pixel regions (28), at least some of which include a sub-wavelength grating structure that provides an anisotropic refractive index profile in orthogonal lateral dimensions, thereby creating an effective material form birefringence. Light incident through liquid crystal element (22) and onto electrode (26) is reflected and experiences a relative phase difference of 180° between its constituent orthogonal polarization components, thereby rotating each polarization component into the orthogonal orientation upon reflection.

19 Claims, 16 Drawing Sheets

(56) References Cited

OTHER PUBLICATIONS

Kelly, Thu-Lan, et al., White-Light Performance of a Polarization-Independent Liquid-Crystal Phase Modulator, Applied Optics. Apr. 1, 1999, pp. 1986-1989, vol. 38, No. 10, Optical Society of America.
Kikuta, Hisao, et al., Optical Elements With Subwavelength Structured Surfaces, Optical review, 2003, pp. 63-73, vol. 10, No. 2, The Optical Society of Japan.
Pang, Y., et al, Metal Nano-grid Reflective Wave Plate, Optics Express, Feb. 16, 2009, pp. 2871-2879, vol. 17, No. 4, OSA
Wang, Jian Jim, et al., High-Performance Optical Retarders Based on All-Dielectric Immersion Nanogratings, Optics Letters, Jul. 15, 2005, pp. 1864-1866, vol. 30, No. 14, Optical Society of America.
"Supplementary Search Report" for EP 05749258.9-2217/1766819, Jan. 21, 2013, European Patent Office, Munich, Germany.
Cole, H. S., et al., A New Reflective Dichroic Liquid-Crystal Display Device, Applied Physics Letters, Jun. 15, 1997, pp. 619-621, vol. 30, No. 12, American Institute of Physics.
Lin, Yi-Hsin, et al., Polarization-Independent Liquid Crystal Phase Modulator Using a Thin Polymer-Separated Double-Layered Structure, Optics Express, Oct. 31, 2005, pp. 8746-8752, vol. 13, No. 22, OSA.
Love, Gordon, Liquid-Crystal Phase Modulator for Unpolarized Light, Applied Optics, May 1, 1993,, pp. 2222-2223, vol. 32, No. 13, Optical Society of America.
Unique Modulators White Paper, Boulder Nonlinear Systems, Inc., Jan. 2007, pp. 1-3, BNS Liquid Crystal Solutions.
Wu, Yung-Hsun, et al., Axially-Symmetric Sheared Polymer Network Liquid Crystals, Optics Express, Jun. 13, 2005, pp. 4638-4644, vol. 13, No. 12, OSA.

\* cited by examiner

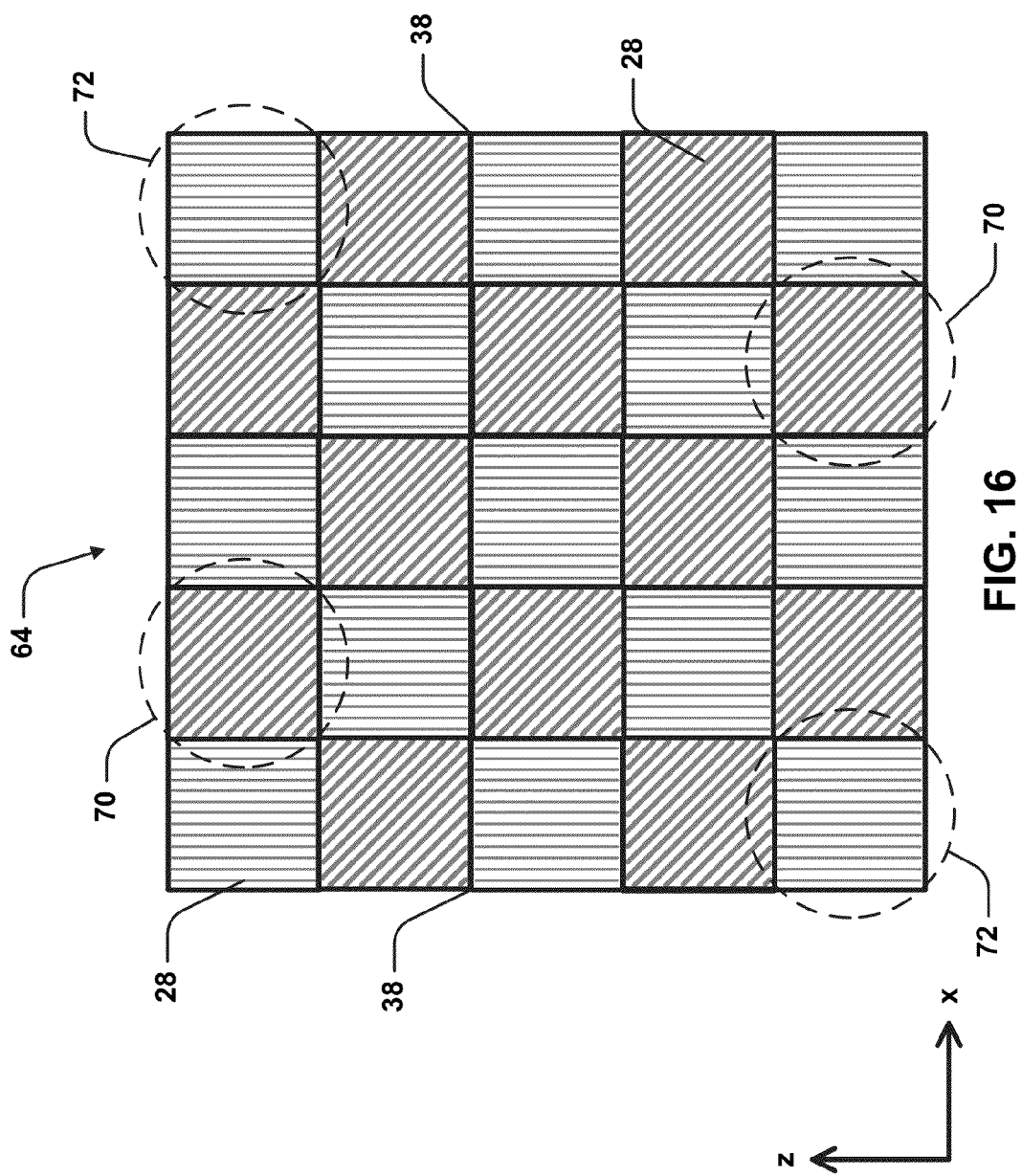

POLARIZATION-INDEPENDENT LCOS DEVICE

CROSS REFERENCE TO RELATED APPLICATIONS

This patent application is a non-provisional of U.S. Provisional Patent Application Ser. No. 61/535,211 filed Sep. 15, 2011, entitled "Polarization-Independent LCOS Device." The entire disclosure of U.S. Provisional Patent Application Ser. No. 61/535,211 is incorporated herein by reference.

FIELD OF THE INVENTION

The present invention relates to optical phase modulator devices and in particular to polarization independent liquid crystal based optical phase modulators. While some embodiments will be described herein with particular reference to that application, it will be appreciated that the invention is not limited to such a field of use, and is applicable in broader contexts.

BACKGROUND

Any discussion of the background art throughout the specification should in no way be considered as an admission that such art is widely known or forms part of common general knowledge in the field.

Liquid crystal on silicon (LCOS) devices are known in the art for use as optical phase modulators, among other applications. LCOS devices can spatially manipulate optical signals by applying a spatially dependent phase profile to the signals. This has many applications, including beam steering, spectral shaping and signal compensation.

Referring to FIG. 1, there is illustrated schematically a conventional LCOS device 1 including a liquid crystal material 3 sandwiched between a transparent glass layer 5 having a transparent electrode, and a mirror 7 mounted on a silicon substrate 9. The mirror is divided into a two-dimensional array of individually addressable pixels. Each pixel is individually drivable by a voltage signal to provide a local phase change to an optical signal, thereby providing a two-dimensional array of phase manipulating regions. Pre-alignment of the liquid crystal elements within material 3 is provided by alignment layers 11 and 13. These layers generally include a plurality of small grooves induced by rubbing of the polyamide layers or other commonly employed techniques, which align the long axis of the individual liquid crystals to define the slow axis of the liquid crystal element.

As shown in FIG. 1, a liquid crystal material includes elongate molecules that lack positional order but have a large scale orientational order. Due to the elongated shape and ordered orientation of liquid crystals, a liquid crystal medium behaves as an anisotropic dielectric, having an axis of birefringence in the direction of the long axis of the molecules (vertically in FIG. 1). Therefore, liquid crystal based devices, such as LCOS devices, are inherently polarization dependent. Consequently, light transmitted onto a conventional LCOS device at an angle to the molecules' long axis will have one linear polarization component modified in phase to a greater degree than the orthogonal component.

One way to account for this polarization dependence is to spatially separate orthogonal polarization components and send one component through a half wave plate, or two passes through a quarter-wave plate. This results in two separate beams propagating through the device, both of which are of the same polarization orientation. This technique presents practical difficulties in optical devices, particularly in ensuring the optical paths and trajectories of each separated polarization state are identical.

Removal or compensation of the polarization dependence of liquid crystals would reduce or remove the need for implementing polarization diversity into the optical device. This would reduce the number of components required in the system, and therefore potentially reduce the cost and complexity of that system. Several techniques for rendering a liquid crystal polarization independent are outlined below.

In G. D. Love, "*Liquid-crystal phase modulator for unpolarized light*", Applied Optics 32, 2222-2223 (1993), it is suggested that a standard nematic liquid crystal LCOS could be made to be polarization insensitive through the combination of a double pass of the LCOS and a quarter wave plate (QWP). This technique is schematically illustrated in FIG. 2, for which reference is now made. As shown, a vertical polarization incident on a liquid crystal cell 15 will be converted into circularly polarized light after propagation through a QWP 17. After one reflection from a mirror 19, the handedness of the polarization switches, and after passing again through the QWP 17, the light passes back through the liquid crystal cell 15 polarized at 90° to the input polarization (corresponding to a 180° phase shift between orthogonal polarization components). In a similar way, a horizontal polarization at the input will emerge vertically polarized. So a given linear input polarization will propagate through the liquid crystal cell 15 as both the original polarization state and also an orthogonal polarization state.

Due to the polarization dependence of the liquid crystal cell 13, the beam will experience a phase change only on one of the two passes through the cell, depending on the polarization state. Importantly, with appropriate orientation of the elements, any input polarization will experience a phase change from the cell.

Earlier, similar techniques for addressing polarization effects were attempted in relation to intensity modulation of liquid crystal display devices (see H. S. Cole and R. A. Kashnow, "*New reflective dichroic liquid-crystal display device*", Appl. Phys. Lett. 30, 619-621 (1977)).

While the above described technique is relatively simple to implement, it is considerably inefficient in practice. As the QWP 17 and mirror 19 are inserted adjacent the liquid crystal cell 15, there is a larger distance between the driving electrode (generally located outside mirror 19 or within mirror 19 itself) and the liquid crystal material. Typical liquid crystal cells have a thickness of about 6 to 10 μm. Typical quartz quarter-wave plates have a thickness of about 44 μm for wavelengths of about 1550 nm. This increased thickness requires the application of higher voltages to effectively drive the liquid crystals. In practice, this technique would likely require a high quality QWP that is very thin. Thinner QWP devices based on polymers are currently available. However, these elements still necessarily increase the device thickness, thereby increasing the required drive voltages.

Another technique for achieving polarization independent liquid crystal operation, at least in a transmission configuration, includes implementing twisted nematic liquid crystal material. Twisted nematic liquid crystals twist in proportion to an applied voltage up to an angle of about 90°. This allows modifying the polarization of the liquid crystal by applying a predetermined drive voltage. In J. Patel and S.-D. Lee, "*Electrically tunable and polarization insensitive fabry-perot etalon with a liquid-crystal film*", Applied Physics Letters 58, 2491 {2493 (1991), it was shown that a twisted nematic liquid crystal could be used as a tunable Fabry-Perot cavity, and that the resonance was not dependent on polarization. This implies that the change in refractive index was the same for each polarization. FIG. 3 illustrates Fabry-Perot resonance in a twisted nematic liquid crystal cell for unpolarized light, as presented in Patel and Lee. This figure illustrates that there is a threshold for this polarization independence. As shown, at low voltages, the peaks are separated, but at large voltages they follow one another closely. Therefore, at low drive voltages, orthogonally polarized inputs experience a different cavity resonance position. That is, at voltages below the threshold, the liquid crystal is birefringent and polarization dependent. However, at voltages much higher than threshold, the polarization dependence is substantially reduced.

The technique described in Patel and Lee is advantageous in that it can be applied in existing CMOS/liquid crystal contact arrangements. Further, liquid crystals based on twisted nematic molecules are a mature technology and well understood. However, twisted nematic liquid crystals rotate the orientation of a given polarization state. This has implications in many optical systems where the polarization orientation must be strictly controlled. In addition, polarization independence is only achieved at drive voltages greater than the threshold value. Therefore, significant drive voltages may be required.

A third technique for addressing the polarization dependence of liquid crystals is to combine two liquid crystal cells of orthogonal orientation. In such a system, one liquid crystal cell acts on one polarization component and the other cell acts on the orthogonal polarization component. A number of techniques have been studied for implementing such dual-cell systems. Early techniques used a glass spacer between the two liquid crystal cells and attempted to independently address each cell. This technique is practically difficult to achieve using a typical CMOS platform. Further, the presence of the additional spacer increases the device thickness and therefore increases the required voltage to drive the liquid crystals.

Lin et. al, ("*Polarization-independent liquid crystal phase modulator using a thin polymer-separated double-layered structure*", Opt. Express 13, 8746-8752 (2005)) discloses a dual liquid crystal cell device having a thin polymer film spacer, allowing the two layers to be treated as a single cell and hence addressed simultaneously. Wu et. Al ("*Axially-symmetric sheared polymer network liquid crystals*", Opt. Express 13, 4638-4644 (2005)) discloses dual liquid crystal cells using liquid crystal gels sandwiched together. FIG. 4 schematically illustrates such an arrangement. The gel structure of the liquid crystal materials possesses enough rigidity to stop the two LC layers from mixing together, thereby removing the need for a spacer.

While these dual-cell techniques can provide near perfect polarization independence, they require the development of polymers and new cell arrangements. Furthermore, using sandwiched liquid crystal gels requires high voltages to achieve relatively small phase shifts.

Work has also been undertaken to produce axially symmetric liquid crystals. Theoretically, the axial symmetry makes these cells completely polarization independent. However, this technology is relatively immature and it is likely that a relatively thick cell is required to achieve the required phase change making the cell response slow and transitions between pixels become blurred due to fringing fields. Further, it is not yet clear whether the axial symmetry can be achieved uniformly for each pixel in an LCOS cell.

Y. Pang and R. Gordon "*Metal nano-grid reflective wave plate*", Opt. Express 17, 2871-2879 (2009) and A. Vengurlekar, "Polarization dependence of optical properties of metallodielectric gratings with sub-wavelength grooves in classical and conical mounts," J. Appl. Phys. 104, 023,109-1-023, 109-8 (2008) disclose a wave plate formed from a periodic grid structure comprised of alternating metal and dielectric regions. Pang and Gordon suggests that such a grid structure can achieve polarization independent attenuation in a dichroic LC cell or for polarization modulated vertical cavity surface emitting lasers. For applications requiring holographic projection such as are found in display and telecommunications, it can be advantageous to be able to control the output polarization and phase of the output light sequentially in either time or space. For such practical optical applications, for example, stereoscopic projection where the image for each eye is projected holographically in an orthogonal polarization state, more advanced control of phase and polarization is required.

The above techniques for providing polarization independent liquid crystal operation each have their relative disadvantages or shortfalls.

SUMMARY OF THE INVENTION

It is an object of the invention, in its preferred form to provide an improved or alternative optical phase modulator.

In accordance with a first aspect of the present disclosure there is provided an optical phase modulator including:
a liquid crystal element; and
a pair of opposing electrodes disposed around said liquid crystal element for supplying an electric potential across said liquid crystal element to drive liquid crystals in a predetermined configuration;
wherein a first said electrode includes a plurality of individually addressable pixels and at least a subset of said addressable pixels include an anisotropic material profile in orthogonal lateral dimensions such that incident light transmitted through said liquid crystal element and onto said first electrode is reflected and experiences a relative phase difference between its constituent orthogonal polarization components.

In one embodiment, preferably at least some of the addressable pixels including an anisotropic material profile are configured to introduce, to incident light, a relative phase difference of substantially 180°, thereby reflecting each polarization component in an orthogonal orientation. In another embodiment, preferably all of the addressable pixels include an anisotropic material profile and are configured to introduce, to incident light, a relative phase difference of substantially 180°, thereby reflecting each polarization component in an orthogonal orientation. In a further embodiment, it is preferable that substantially half of the addressable pixels are configured to introduce, to incident light, a relative phase difference of substantially 180°, thereby reflecting each polarization component in an orthogonal orientation.

Each addressable pixel of the subset preferably includes a reflective sub-wavelength grating structure, the grating structure preferably having a periodic metallic profile in at least a first lateral dimension.

An optical slow axis of the liquid crystal element is preferably oriented at an angle of about 45° to the first lateral dimension.

The sub-wavelength grating structure is preferably defined by a layer of electrically conducting material disposed adjacent a layer of dielectric material, the electrically conducting material including a plurality of laterally periodically disposed projecting regions, which mesh with corresponding recess regions in the dielectric material. The electrically conducting material is preferably selected from the group comprising aluminum, gold, silver and copper. More preferably, the electrically conducting material is aluminum. Preferably the dielectric material is selected from the group comprising silicon-dioxide (SiO2), aluminum oxide (Al2O3), titanium oxide (TiO2), zirconium oxide (ZrO2) and tantalum pentoxide (Ta2O5). More preferably, the dielectric material is silicon dioxide (SiO2).

The dimensions of the grating structure are preferably defined relative to a wavelength of incident light. In one embodiment, the optical phase modulator is preferably configured for operation with an incident light wavelength of about 1.55 μm. In this embodiment, the conducting material preferably has a thickness that varies periodically between about 0.08 μm and 0.32 μm. The dielectric material preferably has a thickness that varies periodically between about 0.12 μm and 0.44 μm. The sub-wavelength grating preferably has a pitch of about 0.75 μm. The projecting regions preferably have a width of about 0.5 μm and the recess regions preferably have a width of about 0.25 μm in the dimension of periodic metallic profile.

The first electrode preferably reflects light with substantially equal amplitude for constituent orthogonal polarization states.

In accordance with a second aspect of the present disclosure, there is provided a liquid crystal cell providing a substantially polarization independent response to input light, said cell including:
a liquid crystal material interposed between a first and second surface, said material having a controllable phase response in accordance with an applied electric field to incident input light;
an electric field generation means for generating said electric field across said liquid crystal material so as to thereby provide said controllable phase response;
an anisotropic reflector for reflecting said input light having traversed said liquid crystal material on a return path again through said liquid crystal material, said anisotropic reflector including an anisotropic material profile such that light incident thereon experiences a relative phase difference between predetermined orthogonal polarisation components;
whereby incident input light traverses said liquid crystal material then undergoes a controlled reflection from said anisotropic reflector before again traversing said liquid crystal material before subsequent output.

In accordance with a third aspect of the present disclosure, there is provided a method of substantially reducing polarization sensitivity of phase control in a liquid crystal on silicon (LCOS) device, said method including the steps of:
transmitting input light through a liquid crystal material;
simultaneously applying an electric field across said liquid crystal material so as to thereby provide a controllable phase response to said input light;
reflecting said input light having traversed said liquid crystal material utilising an anisotropic reflective element and modifying said light such that the reflected light experiences a relative phase difference between its constituent orthogonal polarization components; and
transmitting said reflected light back through said liquid crystal material.

The electric field generation means of the second aspect preferably includes two electrodes on opposite sides of the liquid crystal material and the anisotropic reflector preferably forms one of the electrodes. The anisotropic reflector preferably includes a sub wavelength grating structure formed on a reflective surface thereof.

BRIEF DESCRIPTION OF THE DRAWINGS

Preferred embodiments of the disclosure will now be described, by way of example only, with reference to the accompanying drawings in which:

FIG. 16 is a lateral cross section through a third embodiment driving electrode wherein alternating pixels include periodic grating structures of different orientation and structural dimensions.

DETAILED DESCRIPTION

Figure 1:
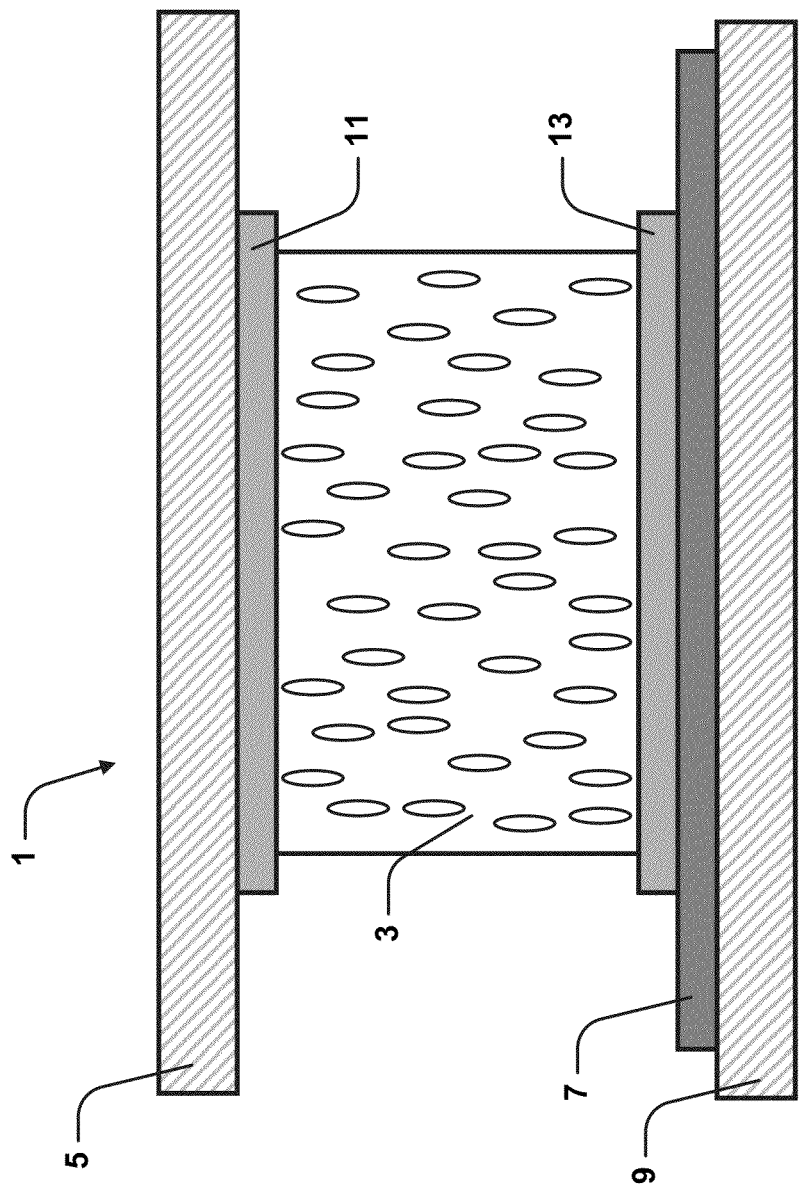
FIG. 1 is a schematic side view of a conventional polarization dependent LCOS device.
Figure 2:
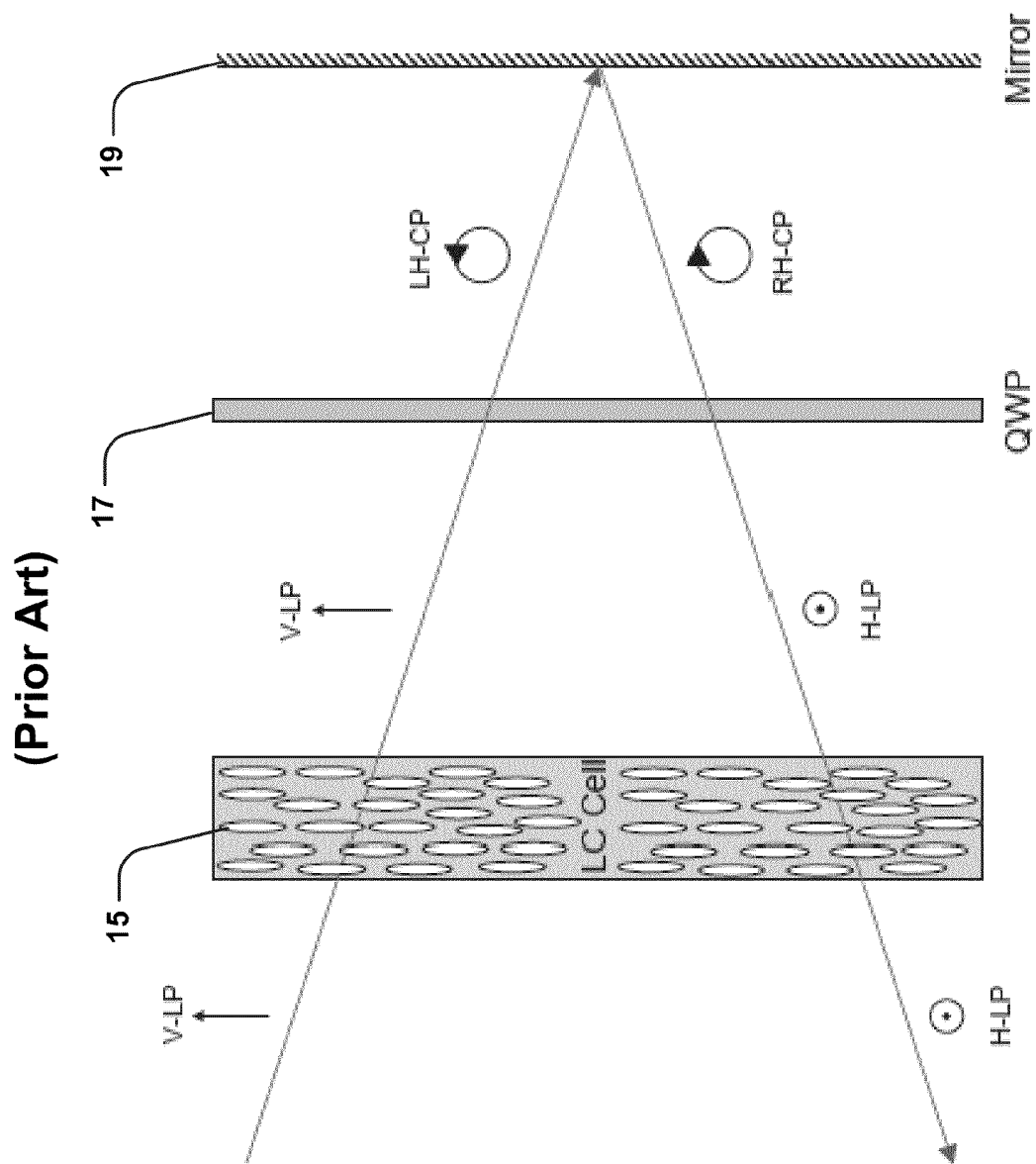
FIG. 2 is a schematic ray diagram of a first prior art technique for providing polarization independent liquid crystal operation.
Figure 3:
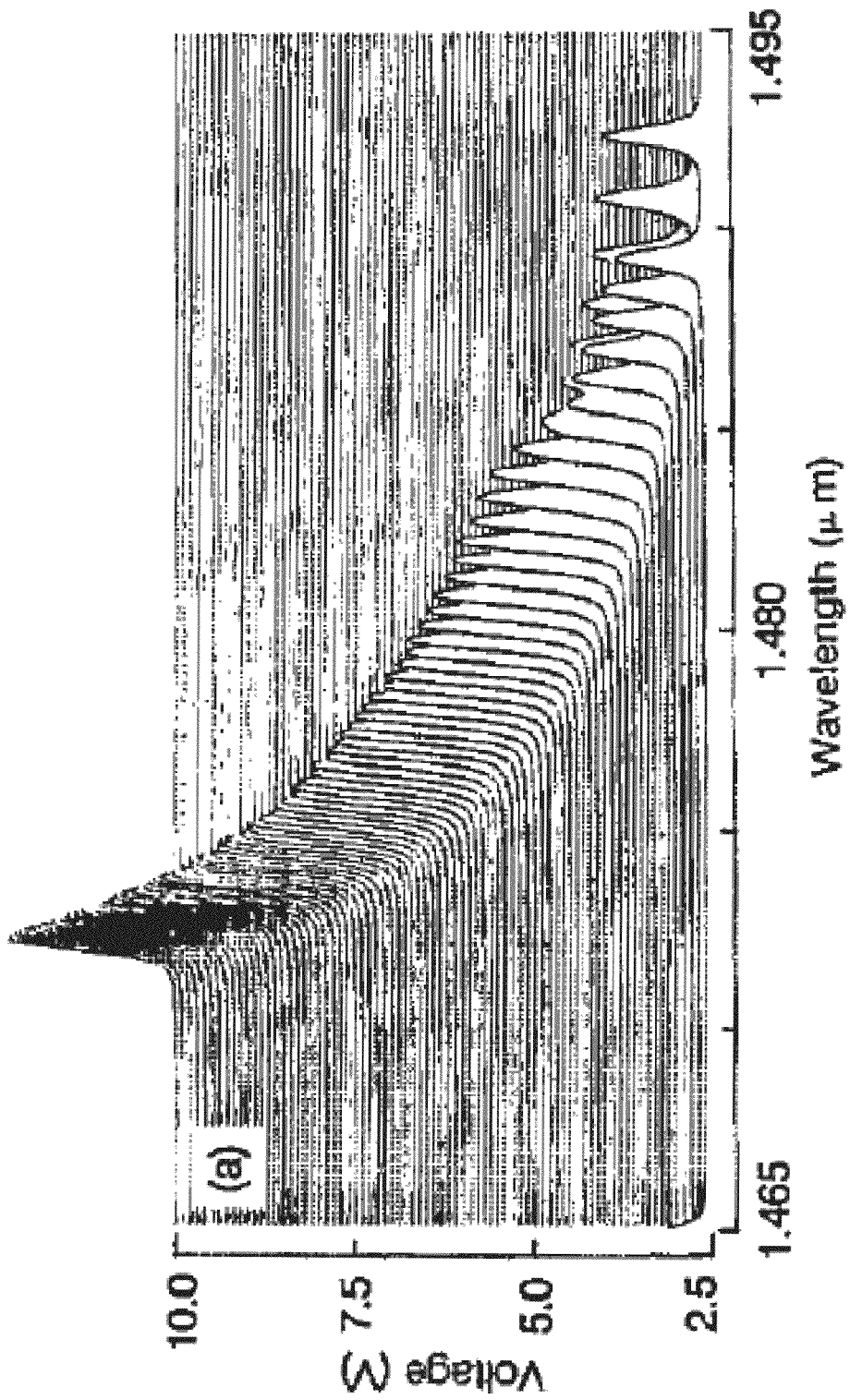
FIG. 3 is a graph of voltage versus wavelength of a second prior art technique for achieving polarization independent liquid crystal operation, the graph illustrating resonance peaks in a twisted nematic liquid crystal.
Figure 4:
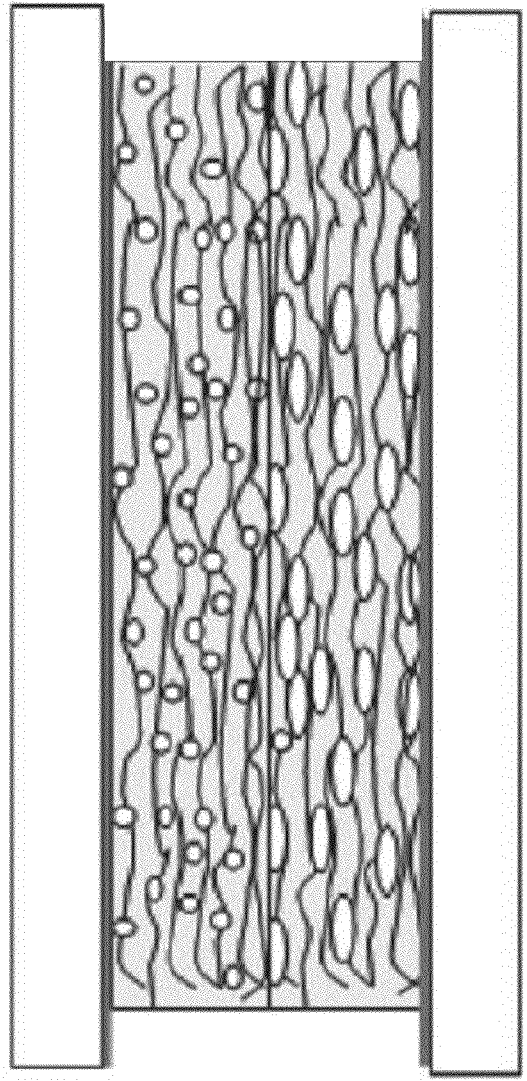
FIG. 4 is a schematic side view of a liquid crystal device including dual liquid crystal gels sandwiched together to provide a third prior art technique for providing polarization independent liquid crystal operation.
Figure 5:
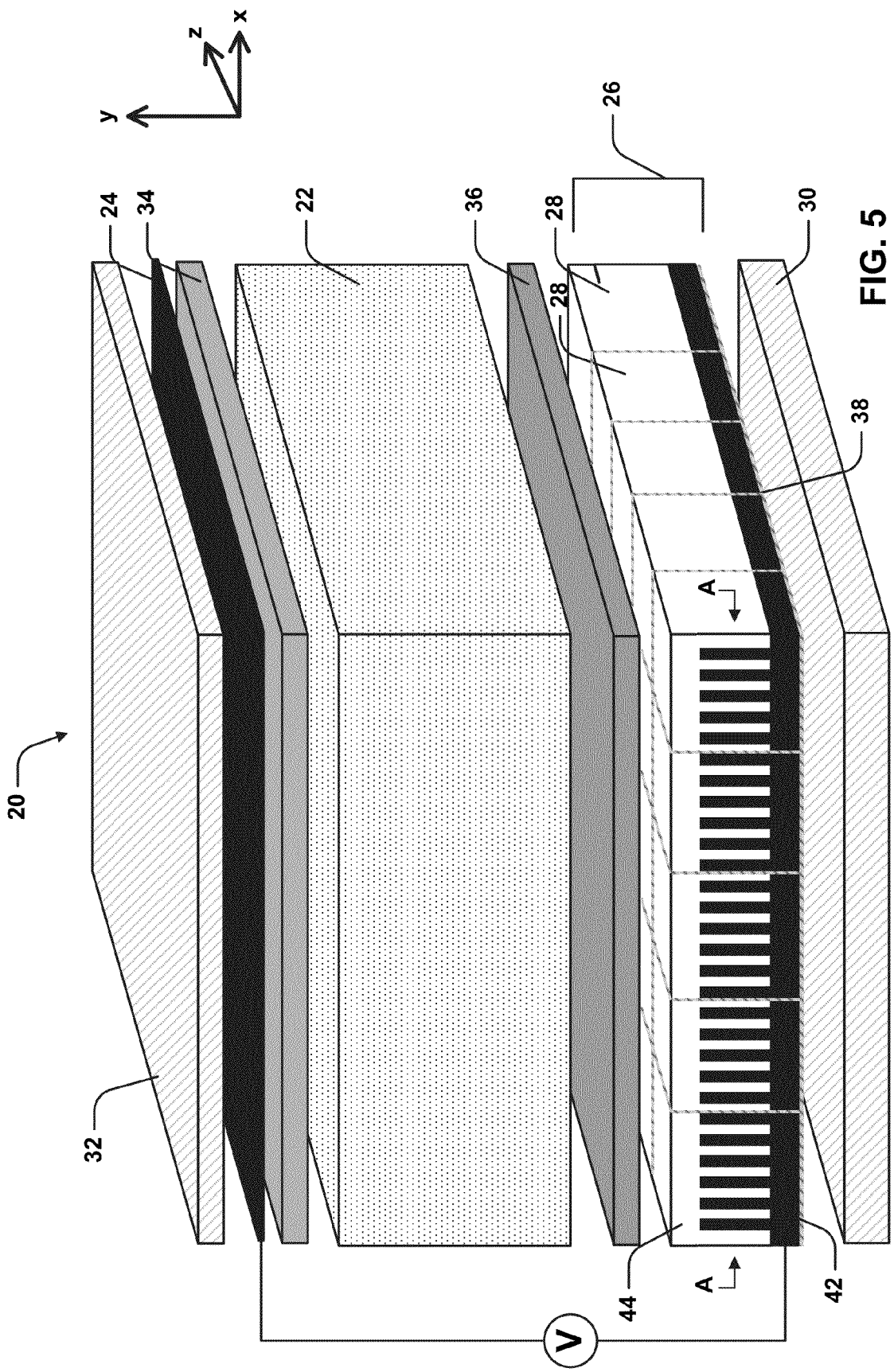
FIG. 5 is an exploded perspective view of a pixel region of an optical phase modulator according to a first embodiment.

Referring initially to FIG. 5, there is illustrated schematically a cross-section of an optical phase modulator 20 including a liquid crystal element 22, disposed between a pair of opposing electrodes 24 and 26. The electrodes 24, 26 are electrically driven for supplying an electric potential V across the liquid crystal element 22 to drive the liquid crystals within element 22 in a predetermined configuration. Electrode 26 includes a grid of individually addressable pixels 28, each having a sub-wavelength grating structure that provides an anisotropic refractive index profile in orthogonal lateral dimensions, thereby creating an effective material form birefringence. Light incident through liquid crystal element 22 and onto electrode 26 is reflected and experiences a relative phase difference of 180° between its constituent orthogonal polarization components, thereby reflecting each polarization component in an orthogonal orientation.

During operation, each polarization component of light propagating through the liquid crystal element 22 experiences equal phase retardation by that element. As will be discussed below, to achieve this equal phase retardation, the axis defined by the sub-wavelength grating structure on pixels 28 should ideally be oriented at an angle of about 45° to the slow axis of the liquid crystal element 22. In use, device 20 operates as an LCOS based optical phase modulator with substantially reduced polarization dependence. Further, as the polarization rotation is performed by the conductive electrode 26, there are no additional phase retardation layers or elements required, such as a quarter-wave plate. This lack of need for additional optical elements provides polarization independence without the associated voltage drop or optical attenuation experienced in other known devices providing polarization independence.

While in FIG. 5, each pixel element 28 is shown having a periodic grating structure, it will be appreciated that in other embodiments, this structure is only applied to a subset of pixels 28. In particular, applying the grating structure to only a subset of pixels 28 has unique applications as discussed below. Further, in some embodiments, the grating structure need not introduce a full 180° phase difference between polarization components and other arbitrary phase differences are possible.

Referring still to FIG. 5, device 20 also includes a silicon substrate base 30 and an outer transparent or partially transparent glass substrate 32 for receiving and transmitting light from a source. The liquid crystal element 22 is contained within two alignment layers 34 and 36, which are preferably formed of polyimide. However, it will be appreciated that the alignment layers can be formed of other materials known in the art. Alignment layers 34 and 36 act to align the long axis of individual liquid crystals within element 22 in a predefined orientation and define the slow and fast axis of the liquid crystal element. Layers 34 and 36 include predefined aligning grooves etched on their inner surface in a manner known in the art. Electrode 24 is situated between the glass layer 32 and alignment layer 34, and is preferably formed of index matching indium-tin-oxide. The index matching property acts to reduce refraction of light passing through electrode 24. Electrode 26 is disposed between alignment layer 36 and silicon base 30 and includes a grid of individually drivable pixel regions 28 for independently driving local liquid crystals in a predefined manner. Pixels 28 are electrically isolated from one another by isolating regions 38.

Figure 6:
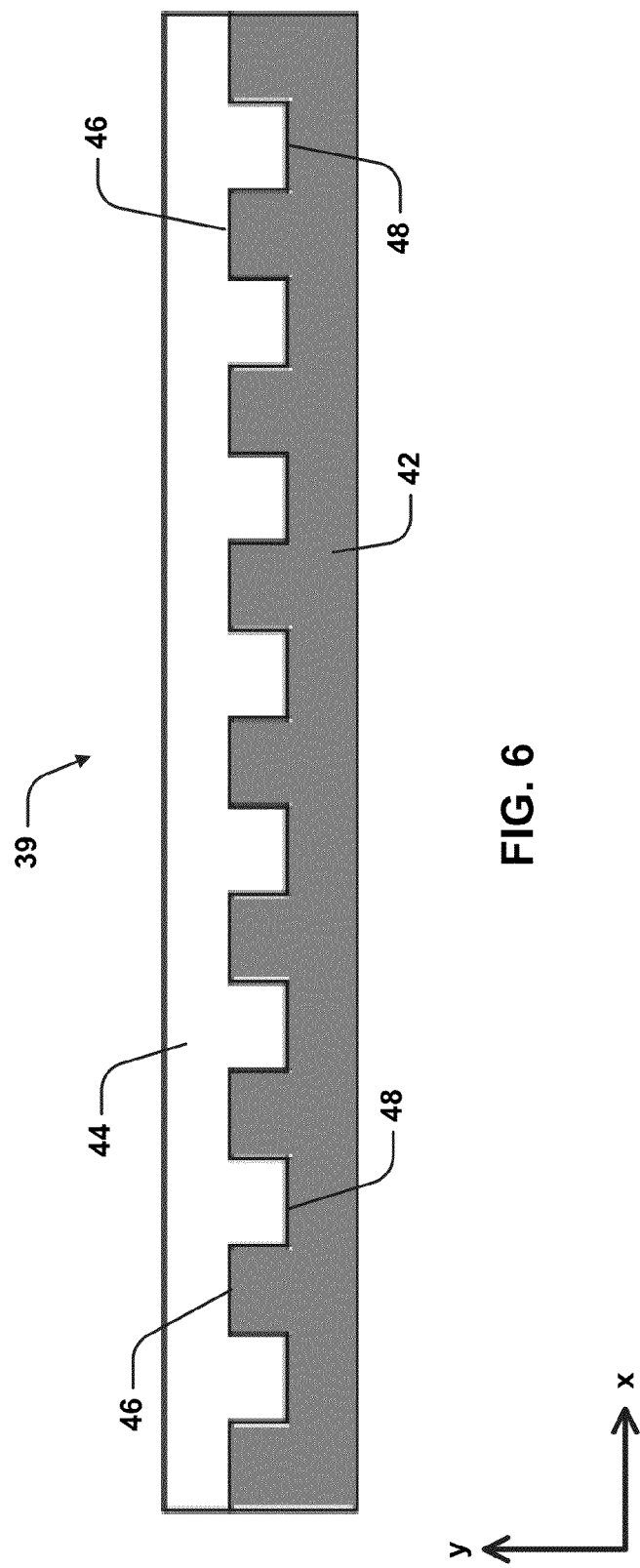
FIG. 6 is a vertical cross section of a first embodiment sub-wavelength grating structure of a pixel on the driving electrode.

Referring now to FIG. 6, there is illustrated a side view of a pixel 39 as an example of pixels 28 illustrated in FIG. 5. As illustrated in FIG. 6, pixel 39 includes a periodic sub-wavelength grating structure formed of a lower, electrically conductive aluminum layer 42 that is sandwiched together with an upper dielectric silicon-dioxide ($SiO_2$) layer 44. In other embodiments, conductive materials including gold, silver and copper may be used in place of aluminum layer 42. In general, it is envisioned that any dielectric material can be used. However, in other embodiments, other preferred dielectric materials, including aluminum oxide ($Al_2O_3$), titanium oxide ($TiO_2$), zirconium oxide ($ZrO_2$) and tantalum pentoxide ($Ta_2O_5$) may be used in place of silicon dioxide layer 44. Aluminum layer 42 includes a plurality of laterally periodically disposed projecting regions 46, which mesh with corresponding recess regions 48 in silicon-dioxide layer 44. Projecting regions 46 and recess regions 48 mesh together in a key arrangement to form a periodic sub-wavelength grating structure in the x-dimension.

Figure 7:
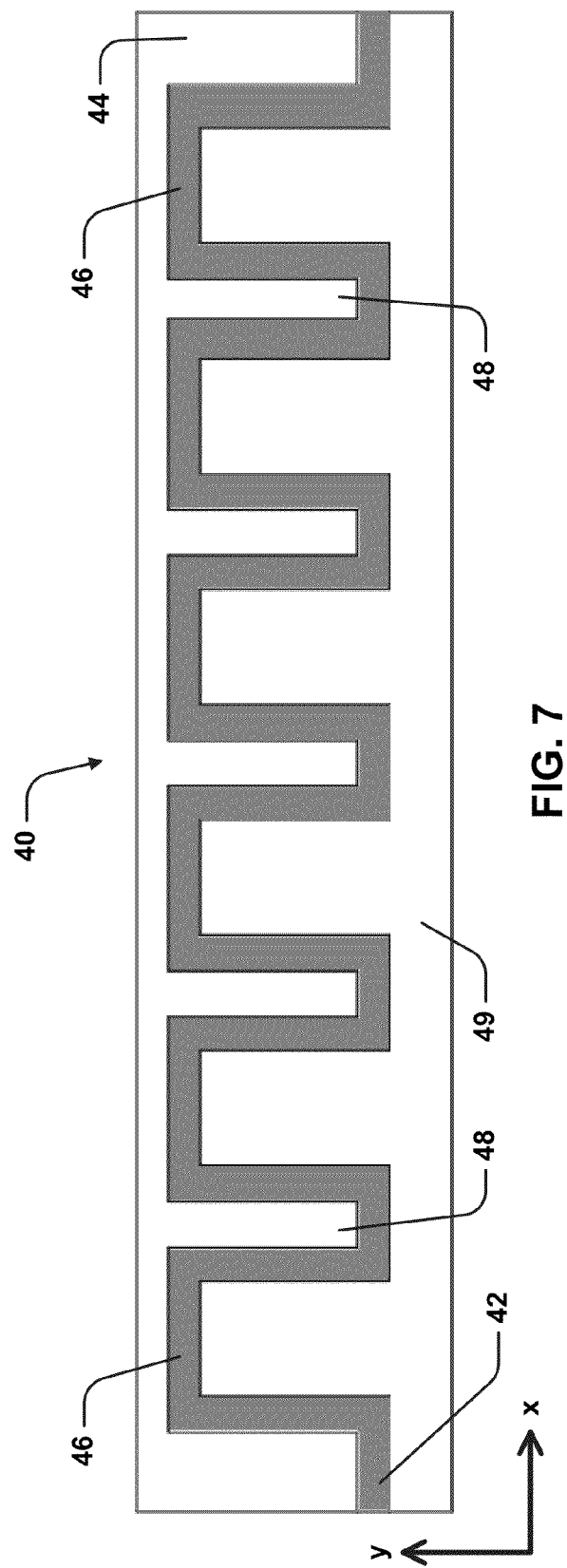
FIG. 7 is a vertical cross section of a second embodiment sub-wavelength grating structure of a pixel on the driving electrode.
Figure 8:
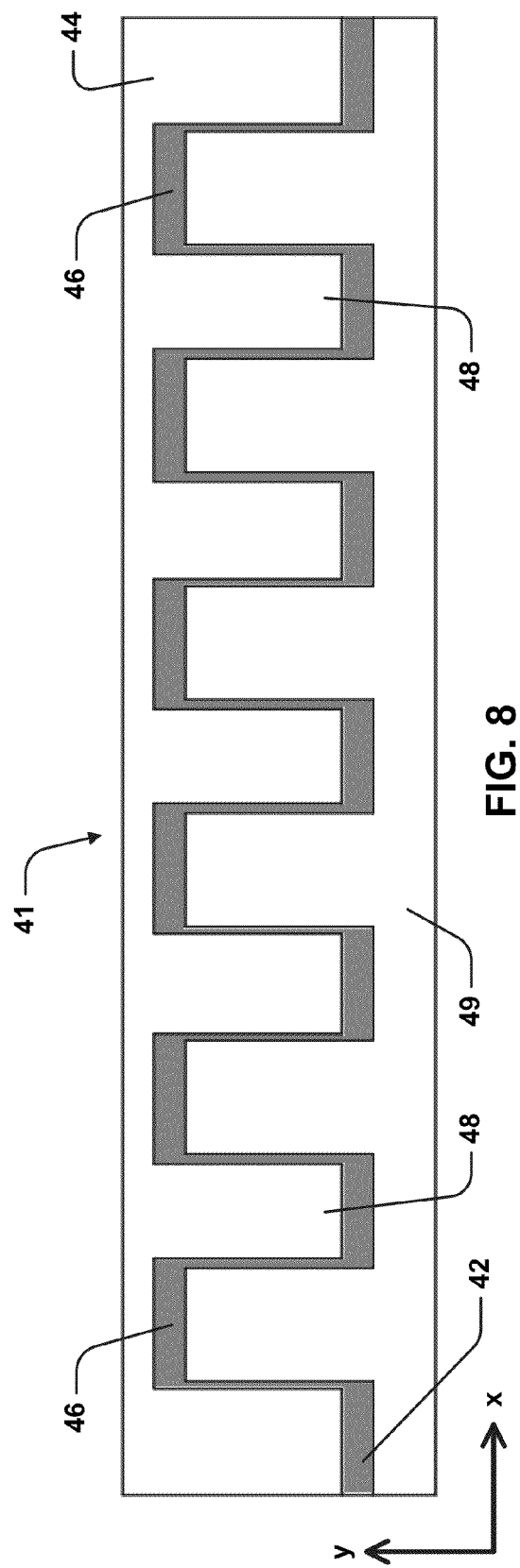
FIG. 8 is a vertical cross section of a third embodiment sub-wavelength grating structure of a pixel on the driving electrode.

It will be appreciated that the periodic grating structure can be realized in other forms. Referring to FIGS. 7 and 8 there is illustrated other example embodiments of pixels 40 and 41, which have grating structures formed of different material layers. In FIG. 7, pixel 40 includes a thin conductive aluminum layer 42 sandwiched between $SiO_2$ layer 44 and an additional $SiO_2$ layer 49. Pixel 41 of FIG. 8 includes a similar grating structure but having thinner vertical regions of aluminum layer 42. The grating structure of pixel 41 would provide a lower relative refractive index difference than the grating of pixel 40, which, in turn, would provide a lower relative refractive index than pixel 39 or FIG. 6.

In use, the periodic structure of sub-wavelength grating dimensions in the x-dimension changes the effective refractive index of incident light polarized in the x-dimension, with respect to that of the y-dimension. This relative refractive index difference gives rise to birefringence in the material, which induces a relative phase change between constituent orthogonal polarization components. At the same time, the material properties of the aluminum layer 42 reflect the light incident thereon. The refractive index difference and dimensions of the grating layers 42 and 44 are preferably chosen such that, upon reflection from electrode 26, the phase difference between orthogonal polarization components (phase retardance) is about 180°. This particular phase retardance acts to rotate the orthogonal polarization components by 90°. However, it will be appreciated that the particular anisotropic material structure of the pixels 28 can be configured to produce other phase differences between polarization states. Specifically, the thicknesses, dimensions and material properties of the respective layers of pixels 28 can be modified to alter the effective relative refractive index difference and thereby alter the phase retardance imposed on incident light.

While a grating with a periodic structure is illustrated, this structure is not strictly required. The basic requirement is that the material structure is anisotropic in orthogonal dimensions such that a relative refractive index difference is established, making the material birefringent. It will be appreciated that this can be achieved by means other than a periodic refractive index structure in one dimension. For example, an anisotropic refractive index profile can be established by writing an aperiodic structure into a material in one dimension such that the effective refractive index in that dimension differs from that of the orthogonal dimension. However, using a periodic structure, it is often easier to establish a desired effective refractive index.

Referring collectively to FIGS. 5 to 8, it is conductive aluminum layer 42 that carries electric current in electrode 26. Conductive aluminum layer 42 is connected to a power source and establishes an electric field between electrodes 24 and 26 to provide an electric potential across liquid crystal element 22.

Figure 9:
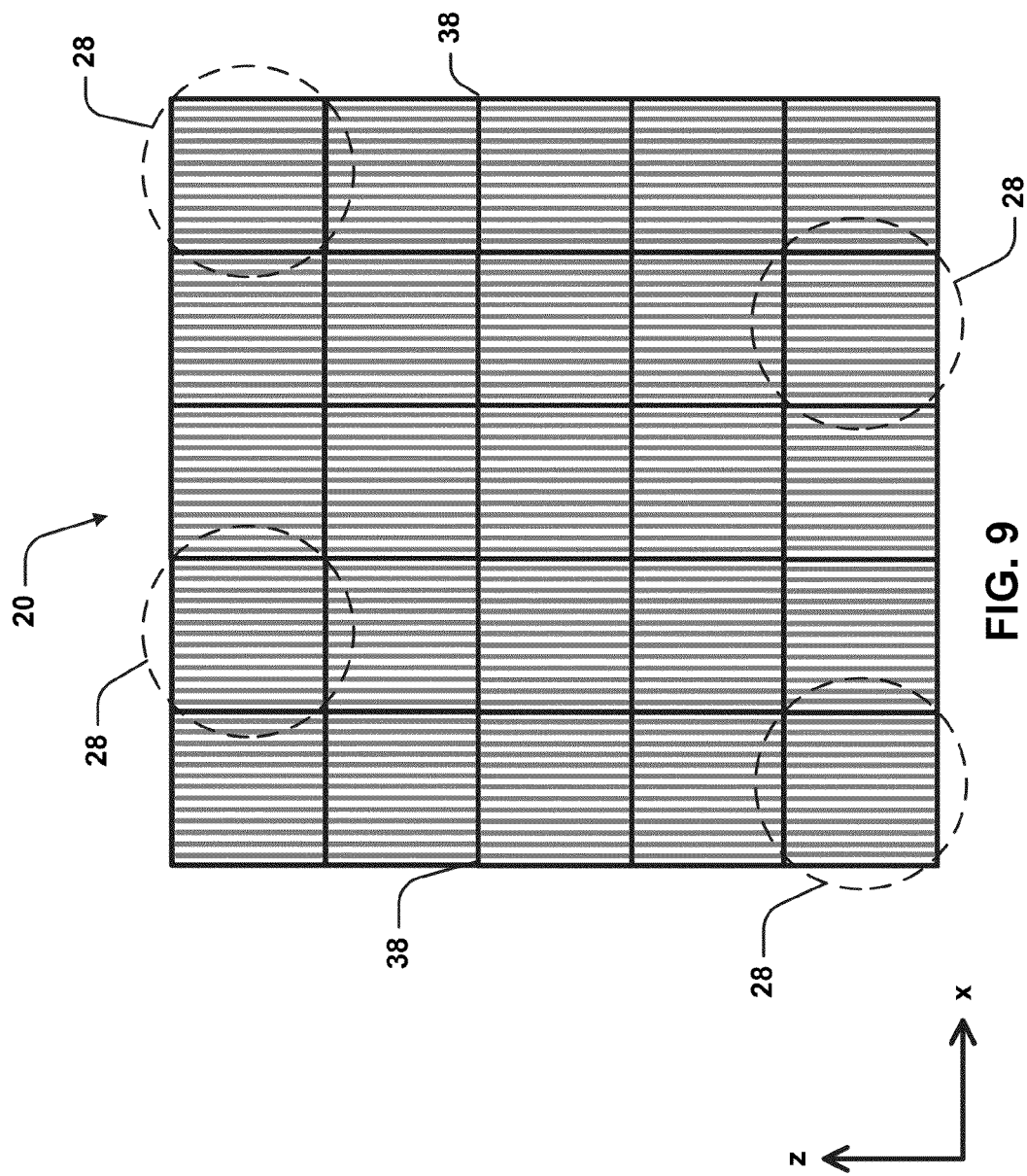
FIG. 9 is a lateral cross section through the driving electrode of FIG. 5, taken along line A-A, showing an exemplary periodic grating structure.

Turning now to FIG. 9, there is illustrated a lateral cross section of electrode 26, showing a number of individual pixels 28, each having a corresponding sub-wavelength grating structure written therein. As previously mentioned, pixels 28 are electrically isolated from each other by isolating regions 38, which are formed by polymer materials or other suitable materials known in the art. While FIGS. 5 and 9 illustrate a 5-by-5 grid of pixels 28, it will be appreciated that, in practice, LCOS device 20 includes a large array of pixels, for example, 640×480 or 1400×1050 pixels.

Figure 10:
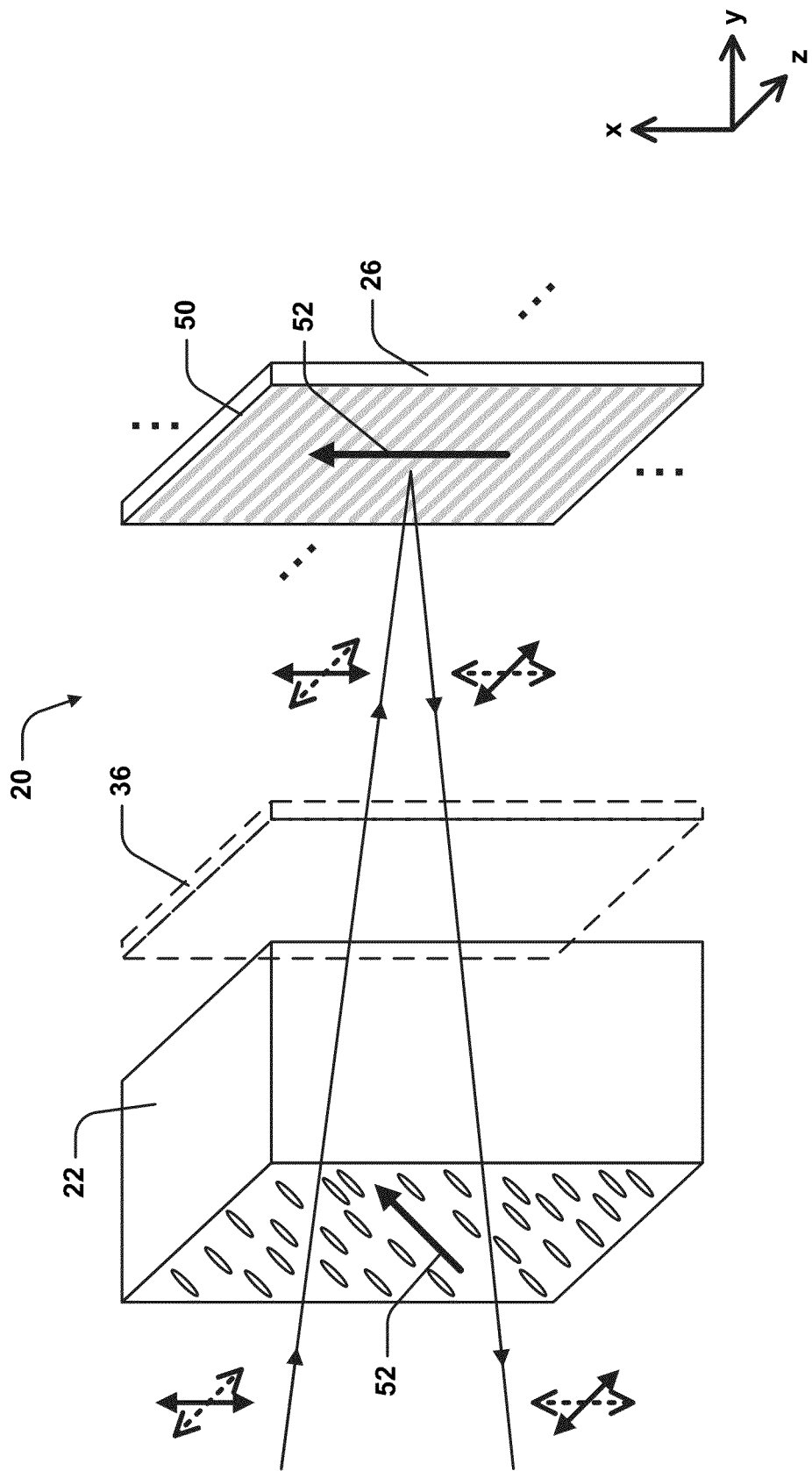
FIG. 10 is a side exploded perspective view of the LCOS device and ray diagram showing the polarization modification process of light incident through the liquid crystal element and reflected off driving electrode having a sub-wavelength grating structure.

Referring to FIG. 10, there is illustrated a schematic ray diagram of light incident through the liquid crystal element 22 and reflected off a pixel 50 of electrode 26 having a periodic sub-wavelength grating structure extending vertically. Alignment layer 36 is shown in outline as it plays no substantial part in the polarization modification process. The incident light has an arbitrary polarization state that is, in the illustrated case, represented by a combination of vertical (solid arrow) and horizontal (dashed arrow) vector components. However, more generally, the total polarization can be represented as a combination of two arbitrary orthogonal polarization vector components, P and S. Upon initially passing through liquid crystal element 22, polarization components parallel to the slow axis of element 22 (designated by arrow 52) are modified by a phase retardance $\Delta\phi$. Components orthogonal to the slow axis do not experience a phase retardance. Upon reflection from pixel 50, a 180° phase difference is introduced between orthogonal polarization components. This flips the polarization components such that the originally horizontal components are now vertical and vice-versa. On returning through element 22, the new horizontal components (previously vertically polarized) experience a phase retardance $\Delta\phi$ while the new vertical components (previously horizontally polarized) experience no phase retardance.

The net result is that, upon reflection from device 20, the optical signal has experienced a substantially polarization independent phase retardance. By applying a suitable drive voltage across element 22, device 20 acts as a polarization independent phase modulator. It will be appreciated that a corresponding phase change and polarization rotation occurs for arbitrary incident polarization states.

Referring still to FIG. 10, in the illustrated example, liquid crystal element 22 has its slow axis oriented at +45°, as shown by arrow 52. The slow axis is the primary axis in which element 22 provides phase retardance. The direction of the sub-wavelength grating in electrode 26 extends vertically, as shown by arrow 54. This 45° orientation offset between the grating direction and liquid crystal slow axis ensures that any phase changes introduced to one polarization state by element 22 on the incident pass are equally applied to the corresponding orthogonal state on the return pass. In other embodiments, slow axis 52 and grating direction 54 are offset at different orientations.

Figure 11:
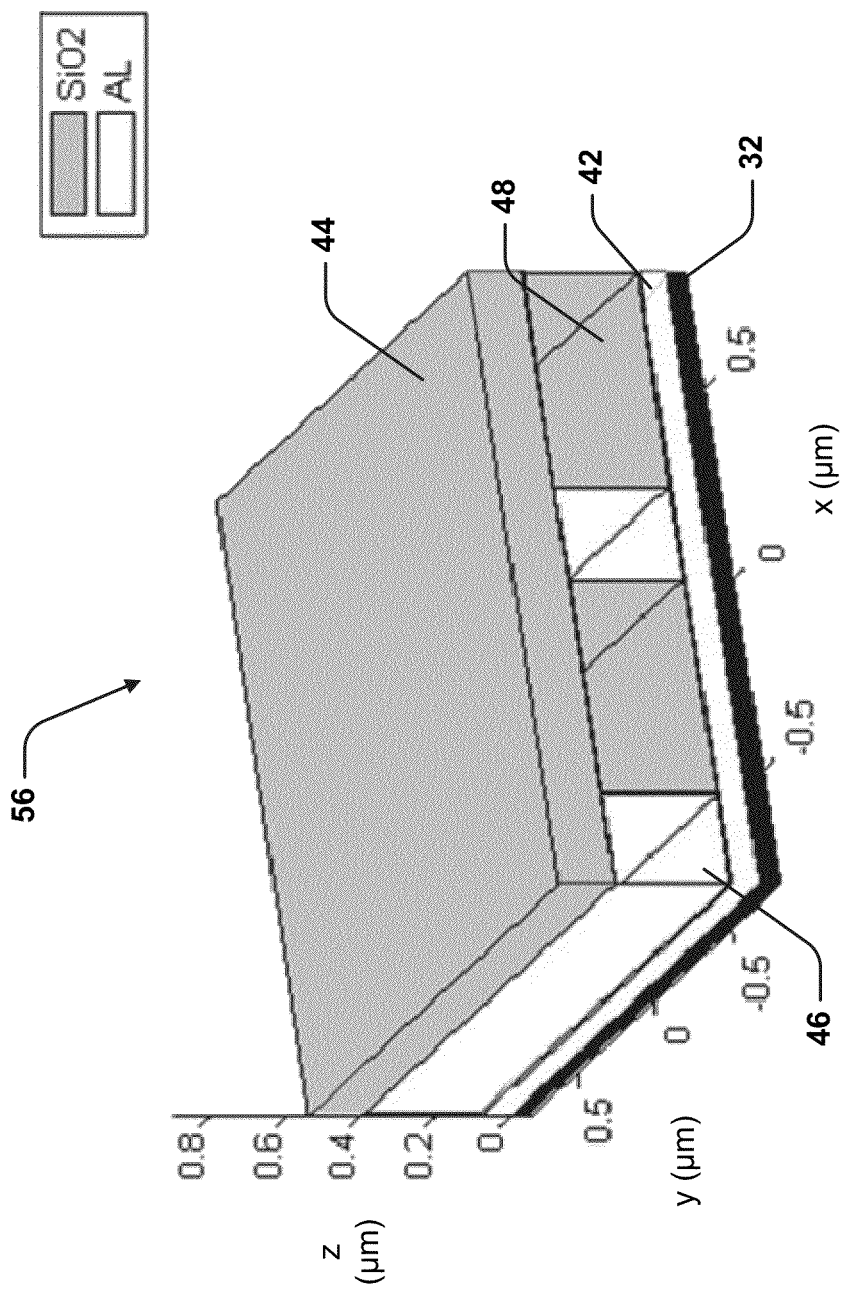
FIG. 11 is a perspective view of an example pixel of the driving electrode, illustrating example dimensions of the respective layers/materials.

Referring now to FIG. 11, there is illustrated a perspective view of one form of construction of a pixel 56 of electrode 26, illustrating example dimensions of the respective layers/materials. The particular dimensions illustrated in FIG. 11 are adapted for operation with an incident light wavelength of 1.55 μm. Aluminum layer 42 has a thickness (in the z-dimension) of about 0.08 μm between projecting regions 46 and a thickness of about 0.4 μm at the projecting regions. Silicon-dioxide layer 44 has a thickness of about 0.44 μm between recess regions 48 and a thickness of about 0.12 μm at recess regions 48. Projecting regions 46 have a width (in the x-dimension) of about 0.5 μm and recess regions 48 have a width of about 0.25 μm, defining a grating periodicity or pitch of about 0.75 μm. These dimensions are sub-wavelength for an operating wavelength of 1.55 μm. It will be appreciated that these dimensions are exemplary and, in other embodiments, other dimensions are possible.

In FIG. 11, the particular dimensions and pitch of the sub-wavelength grating structure are selected such that the device operates efficiently with an incident light wavelength of 1.55 μm. However, in it will be appreciated that the particular dimensions of the grating structure are scalable to allow the optical phase manipulating device 20 to operate efficiently at other wavelengths. For example, the grating dimensions could be scaled down to allow the device 20 to operate at visible wavelengths. Similarly, the grating dimensions could be scaled up in size to allow efficient operation of larger wavelengths of light. Further, the particular materials and material properties can also be varied depending on the desired operational wavelength.

Figure 12:
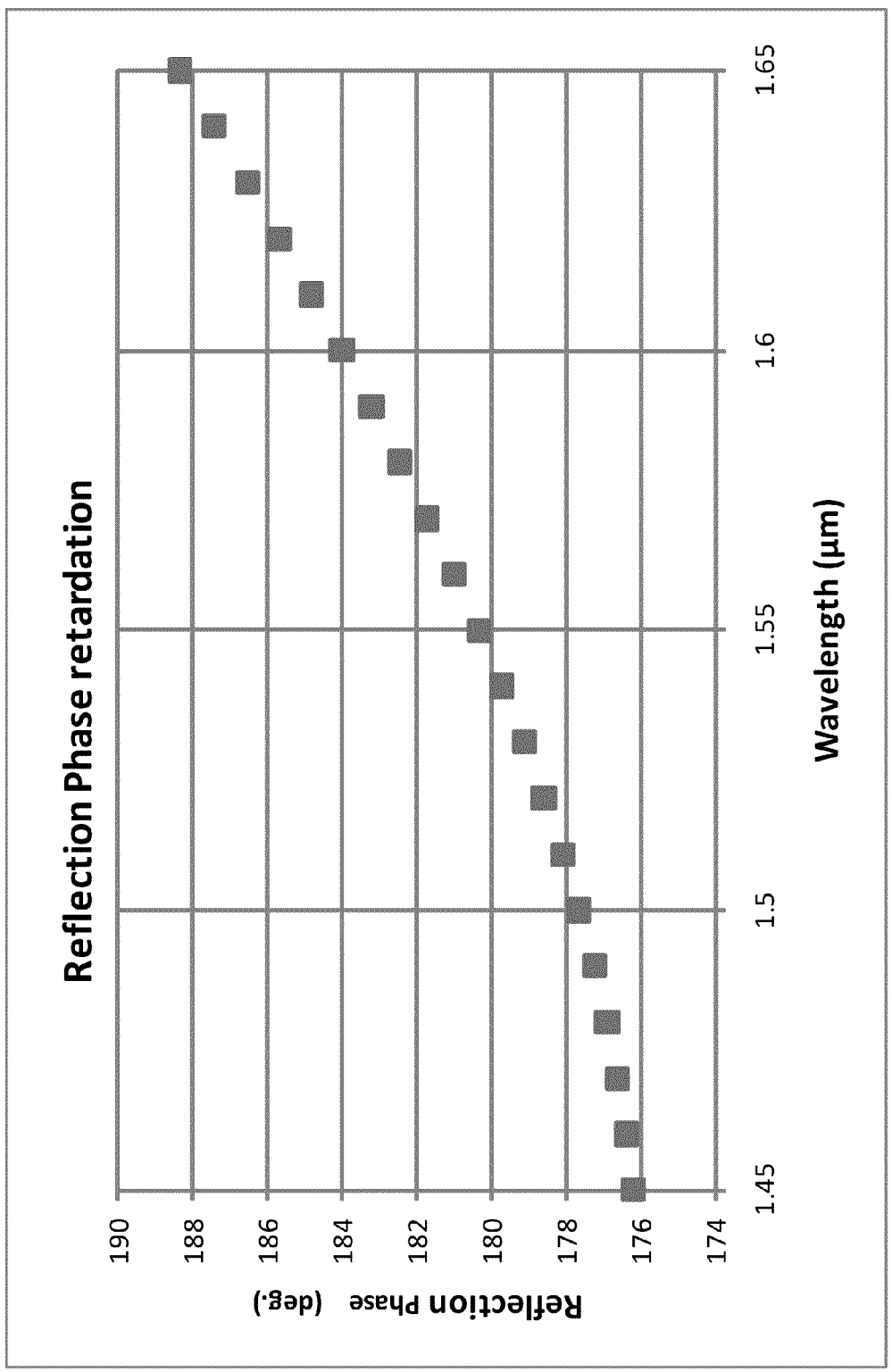
FIG. 12 is a graph of phase retardation of light reflected off the drive electrode, plotted as a function of wavelength for a simulated device with dimensions given in FIG. 11.

To illustrate the wavelength dependence of the device, referring is made to FIG. 12, which illustrates a graph of the phase difference between orthogonal polarization components (phase retardation) introduced by a simulated pixel of electrode 26 having dimensions as shown in FIG. 11. The phase retardation is plotted as a function of the wavelength of incident light between 1.45 μm and 1.65 μm. As shown in FIG. 12, the pixel introduces a phase retardance that increases with increased wavelength. For a pixel with the particular dimensions given in FIG. 11, a phase retardance of 180° is introduced for an incident wavelength of about 1.55 μm. That is, this particular pixel 56 is configured to operate most efficiently at a wavelength of 1.55 μm. Altering the material refractive index and/or the dimensions of the grating structure varies the operational wavelength at which a 180° phase retardance occurs.

Figure 13:
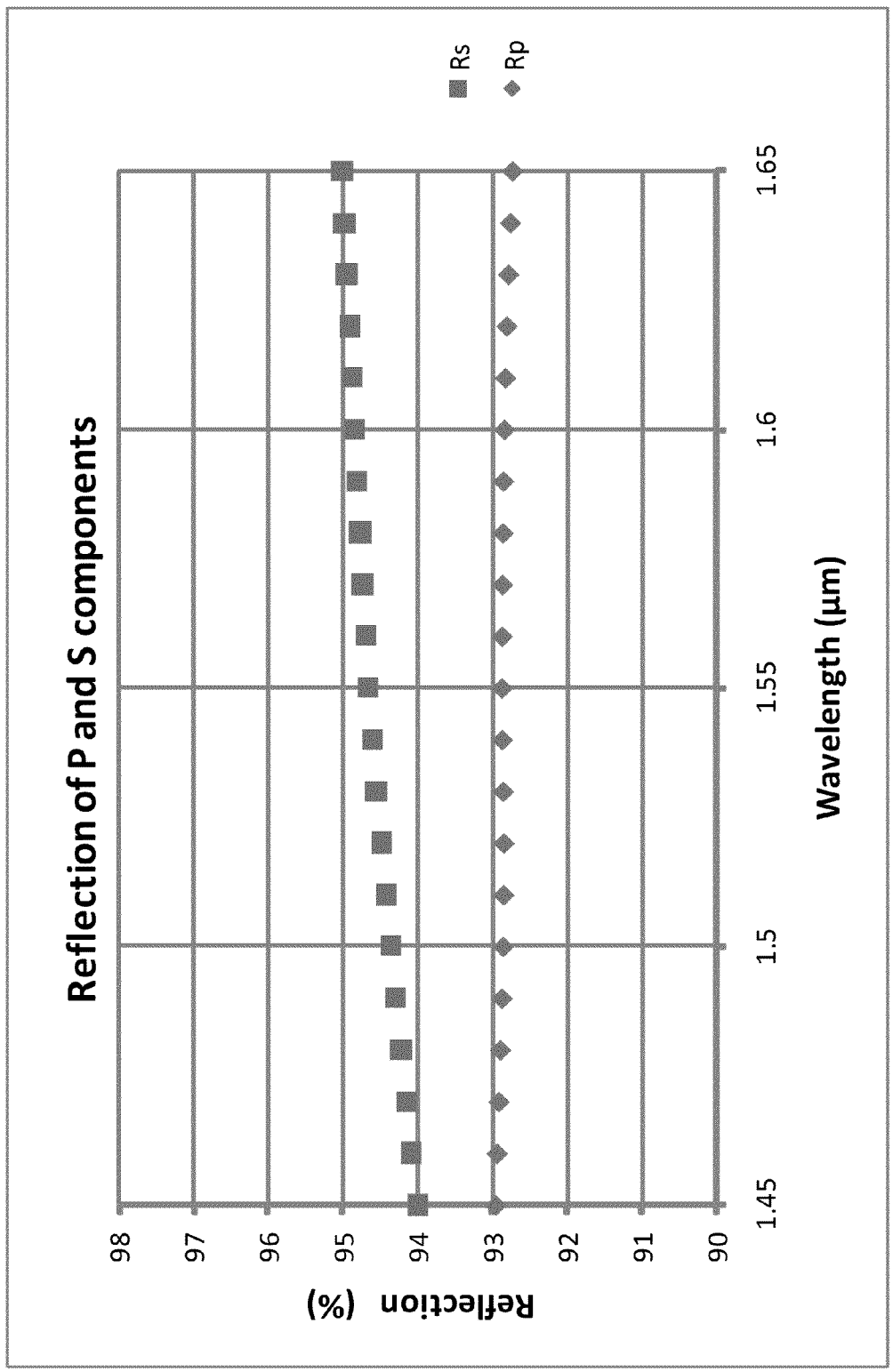
FIG. 13 is a graph of the reflectivity of arbitrary orthogonal polarization components P and S as a function of incident wavelength for a simulated device with dimensions given in FIG. 11.

As mentioned, the aluminum layer also acts as a mirror to reflect light incident onto the driving electrode. Referring now to FIG. 13, there is illustrated a graph of the reflectivity of arbitrary orthogonal polarization components P and S as a function of incident wavelength for a simulated device with dimensions given in FIG. 11. As illustrated, each component P and S is reflected with a substantially similar reflectivity (within a range of about 2%). Ideally, each component P and S would be reflected with the same intensity. The reflectivities can be varied and optimized by altering the grating dimensions during manufacture of electrode 26.

Figure 14:
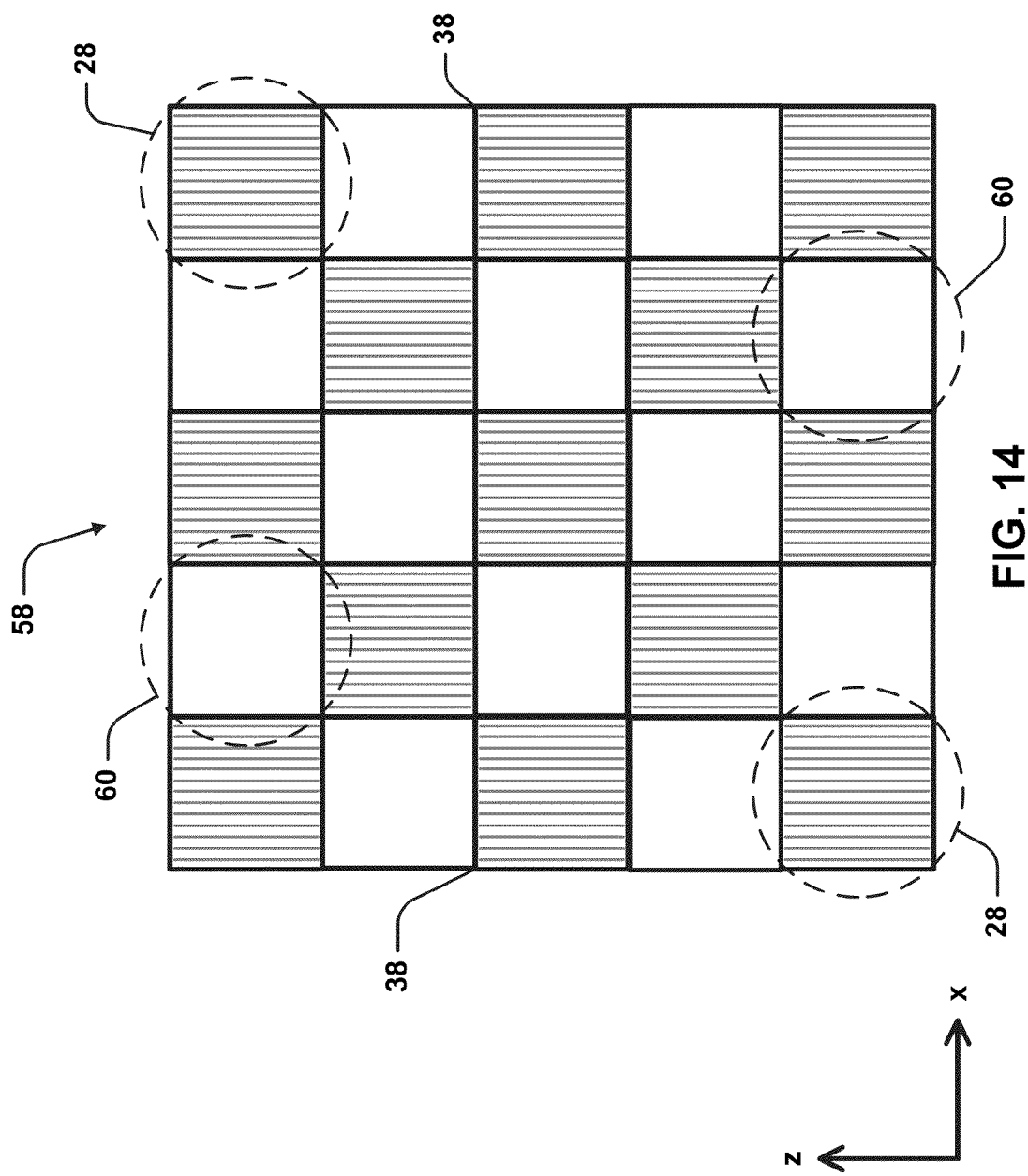
FIG. 14 is a lateral cross section through a second embodiment driving electrode wherein only half of the pixels include the periodic grating structure.

As mentioned previously, in an alternative embodiment, periodic grating structures are written into only a subset of the pixels of the driving electrode. For example, FIG. 14 illustrates a cross section through a further embodiment driving electrode 58. Here corresponding features are given the same reference numerals. In this embodiment, every second pixel includes a periodic sub-wavelength grating structure, thereby defining a first subset of pixels 28 having a grating structure and a second subset of pixels 60 having no grating structure. This arrangement provides capability for independently controlling the phase of orthogonal polarization states of light on a pixel by pixel basis without the need for more than one spatial modulation element.

Such capability has applications in stereoscopic displays and holographic beam processors for telecommunications. For example in stereoscopic displays the information for each eye can be carried in orthogonal polarization states that can be either time multiplexed or spatially multiplexed. In the first case the input polarization state can be modulated between orthogonal polarization states at a rate of 60 Hz or greater and the pixels are driven to modulate the phase of either polarization. The image may be holographically projected as two polarization images using the sequential phase of the optical phase modulator. Alternatively adjacent pixels can be provided drive images for orthogonal polarization states to allow concurrent stereoscope images. In both cases there is capability to create, on a pixel by pixel basis, polarization manipulating elements without significantly impacting the voltage available to drive the liquid crystal. This provides an optimal phase manipulating matrix with the ability to address either two input polarizations and/or two output polarizations simultaneously.

Figure 15:
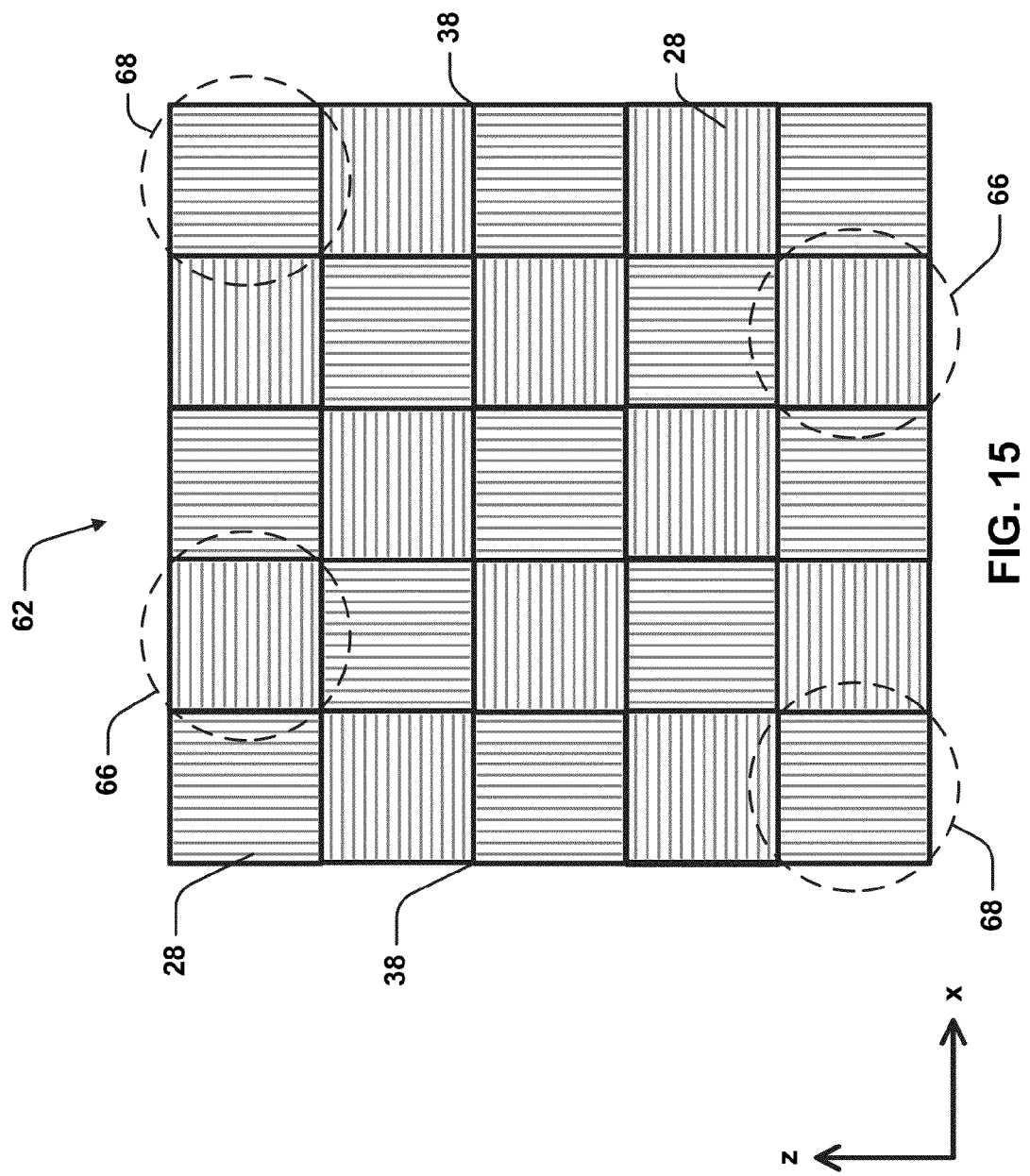
FIG. 15 is a lateral cross section through a third embodiment driving electrode wherein alternating pixels include periodic grating structures of opposite orientation.

Referring now to FIGS. 15 and 16, there are illustrated views of other embodiments of driving electrodes 62 and 64. Electrode 62 of FIG. 15 includes an array of pixels 28 having alternating grating orientations. Pixels 66 include sub-wavelength grating structures that extend vertically and pixels 68 include sub-wavelength grating structures that extend horizontally. Electrode 64 of FIG. 16 includes pixels 70 having sub-wavelength grating structures that extend at an angle of about 45° disposed between pixels 72 having sub-wavelength grating structures that extend horizontally. Pixels 70 also include thicker conductive regions (designated by dark regions) than pixels 72, thereby providing a higher effective refractive index.

Embodiments illustrated in FIGS. 15 and 16 can provide advantages associated with both polarization independence as well as additional functionality to modify the polarization states. For example, pixels 66 are able to be configured to provide the polarization independence as described above, while pixels 68 may be configured to act in a polarizing manner.

While FIGS. 14 to 16 illustrate example alternating pixel grating structures, it will be appreciated that other pixel combinations, having grating structures, can be implemented. For example, in one embodiment, the pixel matrix is centrally divided into two regions: one with pixels having sub-wavelength grating structures and one having pixels without grating structures. Further, it will be appreciated that, depending on the desired application, different, numbers, arrangements and ratios of pixels having sub-wavelength grating structures or various forms and orientations can be implemented.

It will also be appreciated that device 20 is flexible in that additional polarizing and phase modifying elements can be incorporated into device 20 in combination with the above disclosed elements.

Conclusions

The disclosure above provides an improved liquid crystal based optical phase modulator device. In particular, in one embodiment, each individually addressable pixel of a drive electrode includes a sub-wavelength grating structure. This provides a phase modulator that is substantially polarization independent for arbitrary input polarizations. In other embodiments, only a subset of the addressable pixels include a sub-wavelength grating structure. These embodiments provide the ability to independently and simultaneously address either two input polarization states and/or two output polarization states. The latter embodiment has applications in stereoscopic displays and holographic beam processors for telecommunications. In further embodiments, pixel arrays having alternating or different grating structures are implemented to provide additional or combined functionality.

Common to all embodiments is the inclusion of a sub-wavelength grating structure in pixels of the driving electrode. This provides the capabilities mentioned above without the need to insert additional optical elements between the electrode and liquid crystal cell. This substantially minimizes the distance between opposing electrodes, thereby reducing the required voltage to drive the liquid crystal cell, compared to other LCOS devices providing similar capabilities.

Interpretation

Throughout this specification, use of the term "element" is intended to mean either a single unitary component or a collection of components that combine to perform a specific function or purpose.

Throughout this specification, use of the term "orthogonal" is used to refer to a 90° difference in orientation when expressed in a Jones vector format or in a Cartesian coordinate system. Similarly, reference to a 90° rotation is interpreted to mean a rotation into an orthogonal state.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. An optical phase modulator including:
   a liquid crystal element; and
   a pair of opposing electrodes disposed around said liquid crystal element for supplying an electric potential across said liquid crystal element to drive liquid crystals in a predetermined configuration;
   wherein a first said electrode includes a plurality of individually addressable pixels and at least a subset of said addressable pixels include an anisotropic material profile in orthogonal lateral dimensions such that incident light transmitted through said liquid crystal element and onto said first electrode is reflected and experiences a relative phase difference between its constituent orthogonal polarization components;
   wherein each said addressable pixel of said subset includes a reflective sub-wavelength grating structure, said grating structure having a periodic profile in at least a first lateral dimension; and
   wherein an optical slow axis of said liquid crystal element is oriented at an angle of about 45° to said first lateral dimension of said grating structure.

2. An optical phase modulator according to claim 1 wherein at least some of said addressable pixels including an anisotropic material profile are configured to introduce, to said incident light, a relative phase difference of substantially 180°, thereby reflecting each polarization component in an orthogonal orientation.

3. An optical phase modulator according to claim 1 wherein all of said addressable pixels include an anisotropic material profile and are configured to introduce, to incident light, a relative phase difference of substantially 180°, thereby reflecting each polarization component in an orthogonal orientation.

4. An optical phase modulator according to claim 2 wherein substantially half of said addressable pixels are configured to introduce, to incident light, a relative phase difference of substantially 180°, thereby reflecting each polarization component in an orthogonal orientation upon reflection.

5. An optical phase modulator according to claim 1 wherein said grating structure comprises a periodic metallic profile in at least a first lateral dimension.

6. An optical phase modulator according to claim 1 wherein said sub-wavelength grating structure is defined by a layer of electrically conducting material disposed adjacent a layer of dielectric material, said electrically conducting material including a plurality of laterally periodically disposed projecting regions, which mesh with corresponding recess regions in said dielectric material.

7. An optical phase modulator according to claim 6 wherein said electrically conducting material is selected from the group comprising aluminum, gold, silver and copper.

8. An optical phase modulator according to claim 7 wherein said electrically conducting material is aluminum.

9. An optical phase modulator according to claim 6 wherein said dielectric material is selected from the group comprising silicon-dioxide ($SiO_2$), aluminum oxide ($Al_2O_3$), titanium oxide ($TiO_2$), zirconium oxide ($ZrO_2$) and tantalum pentoxide ($Ta_2O_5$).

10. An optical phase modulator according to claim 6 wherein the dimensions of said grating structure are defined relative to a wavelength of said incident light.

11. An optical phase modulator according to claim 10 configured for operation with an incident light wavelength of about 1.55 μm.

12. An optical phase modulator according to claim 11 wherein said conducting material has a thickness that varies periodically between about 0.08 μm and 0.32 μm.

13. An optical phase modulator according to claim 11 wherein said dielectric material has a thickness that varies periodically between about 0.12 μm and 0.44 μm.

14. An optical phase modulator according to claim 11 wherein said sub-wavelength grating has a pitch of about 0.75 μm.

15. An optical phase modulator according to claim 11 wherein said projecting regions have a width of about 0.5 μm and said recess regions have a width of about 0.25 82 m in the dimension of periodic refractive index.

16. A liquid crystal cell providing a substantially polarization independent response to input light, said cell including:
   a liquid crystal material interposed between a first and second surface, said material having a controllable phase response in accordance with an applied electric field to incident input light;
   an electric field generation means for generating said electric field across said liquid crystal material so as to thereby provide said controllable phase response;
   an anisotropic reflector for reflecting input light having traversed the liquid crystal material on a return path again through the liquid crystal material, said isotropic reflector including a sub-wavelength grating structure having a periodic profile in at least a first lateral dimension that is at an angle of about 45° to an optical slow axis of said liquid crystal material such that light incident thereon experiences a relative phase difference between orthogonal polarisation components;
   whereby incident input light traverses said liquid crystal material then undergoes a controlled anisotropic reflection from said anisotropic reflector before again traversing said liquid crystal material before subsequent output.

17. A liquid crystal cell according to claim 16 wherein said electric field generation means includes two electrodes on opposite sides of said liquid crystal material and said anisotropic reflector forms one of said electrodes.

18. A liquid crystal cell according to claim 16 wherein said anisotropic reflector includes a sub wavelength grating structure formed on a reflective surface thereof.

19. A method of substantially reducing polarization sensitivity of phase control in a liquid crystal on silicon (LCOS) device, said method including the steps of:
- transmitting input light through a liquid crystal material;
- simultaneously applying an electric field across said liquid crystal material so as to thereby provide a controllable phase response to said input light;
- reflecting said input light having traversed the liquid crystal material utilising an anisotropic reflective element including a reflective sub-wavelength grating structure having a periodic profile in at least a first lateral dimension that is at an angle of about 45° to an optical slow axis of said liquid crystal material, and modifying said light such that the reflected light experiences a relative phase difference between its constituent orthogonal polarization components; and
- transmitting said reflected light back through said liquid crystal material.

\* \* \* \* \*

UNITED STATES PATENT AND TRADEMARK OFFICE
CERTIFICATE OF CORRECTION

| | | |
|---|---|---|
| PATENT NO. | : 9,065,707 B2 | Page 1 of 1 |
| APPLICATION NO. | : 13/609321 | |
| DATED | : June 23, 2015 | |
| INVENTOR(S) | : Frisken et al. | |

It is certified that error appears in the above-identified patent and that said Letters Patent is hereby corrected as shown below:

In the Claims:

Claim 15 (Col. 14, line 36) correct as follows:

--and said recess regions have a width of about 0.25 μm in the--

Signed and Sealed this
Fifteenth Day of March, 2016

Michelle K. Lee
*Director of the United States Patent and Trademark Office*